United States Patent [19]

Ganner

[11] Patent Number: 5,417,264
[45] Date of Patent: May 23, 1995

[54] DOWEL TRANSFER STATION IN DOWEL DRIVING DEVICES

[76] Inventor: Erwin Ganner, Kreuzacker 36, A-6410 Telfs, Austria

[21] Appl. No.: 184,282

[22] Filed: Jan. 21, 1994

[30] Foreign Application Priority Data

Feb. 15, 1993 [AT] Austria ................... 269/93

[51] Int. Cl.$^6$ ........................................... B27B 31/00
[52] U.S. Cl. .................. 144/245 R; 144/2 R; 144/12; 144/242 R; 221/151; 221/156; 227/26; 227/39
[58] Field of Search ........ 144/2 R, 12, 242 R, 144/245 R, 2 F; 221/175, 183, 274, 151, 156; 227/14, 15, 26, 39

[56] References Cited

U.S. PATENT DOCUMENTS

| 1,031,589 | 7/1912 | Russell . |
| 1,074,158 | 9/1913 | Bell et al. . |
| 3,068,916 | 12/1962 | Richardson et al. . |

FOREIGN PATENT DOCUMENTS

| 35898 | 11/1965 | Germany . |
| 2559089 | 7/1977 | Germany . |
| 3717129A1 | 12/1988 | Germany . |

OTHER PUBLICATIONS

Gannomat, Model 251, "Dowel Inserter for Simultaneous Dowel and Glue Insertion in the Same Hole".
B.Re.Ma., Mod. Gln/520, "Machine for Inserting Glue and Pins, Equipped with Gun".
Ayen, Präzisionsmaschinen für die Holzbearbeitung, Dübeleintreibgerät Düpo Te 2 Hoffmann, Moderne, Arbeitssysteme, die Anlagen mit den Vielen Vorteilen–Zuverlässig Durch Tausendfach Bewährte Technik: "Dübelfix-Dübeleinschiess- Anlagen".

*Primary Examiner*—W. Donald Bray
*Attorney, Agent, or Firm*—Friedrich Kueffner

[57] ABSTRACT

A dowel transfer station in a dowel driving device which includes a dowel separating and conveying unit and a manually operated driving gun to which dowels are supplied through a hose line. The dowel transfer station is arranged between the dowel separating and conveying unit and the hose line conducted to the driving gun. The dowel transfer station includes a reciprocating dowel holder which receives a dowel emerging from the dowel separating and conveying unit and supplies the dowel to the opening of the hose line conducted to the driving gun. For eliminating dowels which do not have the appropriate size, the dowel holder has a bore for receiving a dowel, wherein the depth of the bore is adjustable and the inner end of the bore is connected to a compressed air line which can be switched on and off by a valve. The plane of the outer opening of the bore in the dowel holder is arranged at a slight distance from the plane of the opening of the hose line and/or the plane of the dowel outlet opening of the dowel separating and conveying unit.

12 Claims, 2 Drawing Sheets

DOWEL TRANSFER STATION IN DOWEL DRIVING DEVICES

BACKGROUND OF THE INVENTION

1. Field of the Invention

The present invention relates to a dowel transfer station in dowel driving devices which include a dowel separating and conveying unit constructed, for example, in the form of a cup-shaped oscillating conveyor and a manually operated driving gun to which dowels to be driven in are supplied through a hose line. The dowel transfer station is arranged between the dowel separating and conveying unit, on the one hand, and the hose line conducted to the driving gun, on the other hand. The dowel transfer station includes a reciprocating dowel holder which receives a dowel emerging from the dowel separating and conveying unit and supplies the dowel to the opening of the hose line conducted to the driving gun.

2. Description of the Related Art

Dowel driving devices with manually operated driving guns are known in the art. Devices of this type are produced by various manufacturers and are commercially available under the tradenames "Gannomat Modell 251"; "B.RE.MA Mod. GLN 520"; Ayen-Düpo TE 2" and "Dübelfix Hoffmann". As a rule, the dowel separating and conveying unit is composed of an oscillating conveyor which serves to individually supply the dowels to a dowel transfer station. At the dowel transfer station, the dowel emerging from the oscillating conveyor is grasped by tongs which are movable in their plane and which subsequently transfer the dowel to the opening of the hose line in which the dowel is supplied by means of compressed air to the driving gun. Instead of using oscillating conveyors, other separating units, i.e., Ayen-Düpo TE 2, operate in accordance with a balance beam system, wherein the system is equipped with a diameter calibration and a device for testing the length of the dowels. Dowels which are too thick are automatically calibrated in the calibrating unit to the desired dimension and dowels which are too short are separated out in the device for testing the length of the dowels. This ensures that dowels which are not appropriate for the task at hand are not supplied to the driving gun and do not block the mechanism of the driving gun. These devices have the disadvantage that they operate relatively slowly. In the systems mentioned first whose transfer stations operate with reciprocating tongs, it has thus far not been possible to test the length of the dowels. If the quantity of dowels made available contains dowels which are too long or too short, the dowels are nevertheless conducted to the driving gun where they cause problems and impair the operation of the driving gun. Dowels which do not have the proper dimensions may also cause problems of this type already at the transfer station.

SUMMARY OF THE INVENTION

Therefore, it is the object of the present invention to provide a dowel transfer station of the above-described type which is constructed in such a way that, of the dowels which individually arrive at the dowel transfer station, those which do not have the appropriate length, whether they be too short or too long, are eliminated at the dowel transfer station before they can reach the driving gun and block the mechanism of the driving gun.

In accordance with the present invention, for eliminating dowels which do not have the appropriate size, the dowel holder of the dowel transfer station has a bore for receiving a dowel, wherein the depth of the bore is adjustable and the inner end of the bore is connected to a compressed air line which can be switched on and off by means of a valve. The plane of the outer opening of the bore in the dowel holder is arranged at a slight distance from the plane of the opening of the hose line and/or the plane of the dowel outlet opening of the dowel separating and conveying unit.

In accordance with the invention, the term "slight distance" is understood to mean that only a small gap exists between the above-mentioned planes or components. The size of the gap is selected in such a way that a free relative mobility of the components is ensured. The width of the gap may be 1 mm or only a fraction of a millimeter.

The various features of novelty which characterize the invention are pointed out with particularity in the claims annexed to and forming a part of the disclosure. For a better understanding of the invention, its operating advantages, specific objects attained by its use, reference should be had to the drawing and descriptive matter in which there are illustrated and described a preferred embodiment of the invention.

DETAILED DESCRIPTION OF THE PREFERRED EMBODIMENTS

Figure 1:
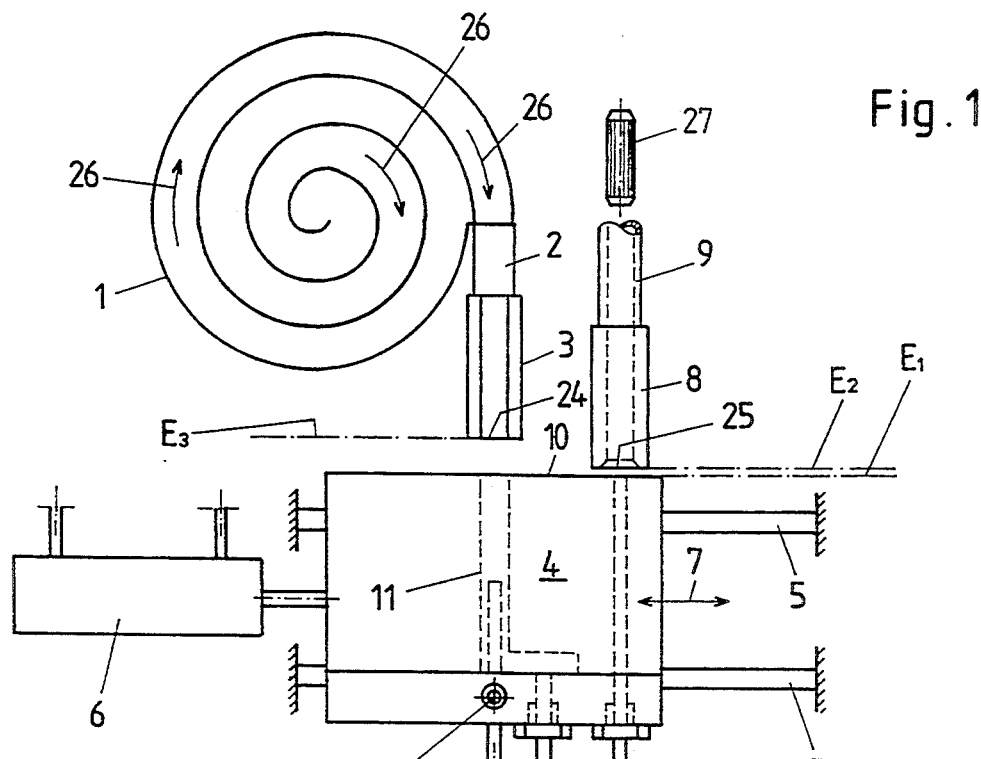
FIG. 1 is a top view of the dowel transfer station according to the present invention.

The illustration of FIG. 1 of the drawing includes a top view of a dowel transfer station for a dowel driving device, wherein only the dowel separating and conveying unit of the dowel driving unit is shown in the drawing. The dowel separating and conveying unit is constructed as a cup-shaped oscillating conveyor 1. Such cup-shaped oscillating conveyors 1 are used in automatic tools and are well known in the art. The discharge area of the oscillating conveyor 1 extends into a pipe piece 2 which ends in an open groove 3. A dowel holder 4 constructed as a carriage is mounted on two rails 5 which extend parallel to each other and are situated in a horizontal plane. As indicated by arrow 7, the dowel holder 4 is horizontally displaceable by means of a piston-cylinder unit 6. Limit switches and sensors, not shown in the drawing, limit the displacement distance of the dowel holder 4 and are integrated in the control unit of the transfer station. The end of a flexible hose 9 which is grasped by a retainer 8 is located parallel and adjacent to the groove 3. The hose 9 is conducted to a driving gun, not shown, as they are conventionally used in such dowel driving devices and which, in addition to the hose 9, are connected to a glue supply line and a compressed air line. The driving gun is not illustrated in the drawing because its configuration is not essential to the present invention.

Figure 2:
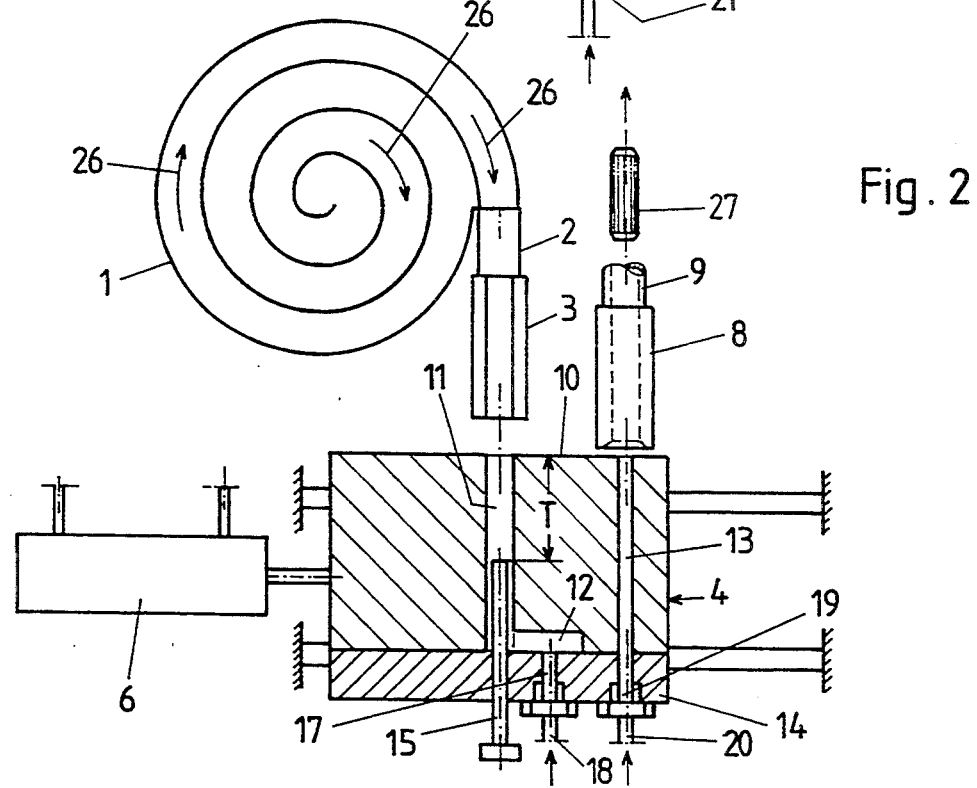
FIG. 2 is the same view as FIG. 1, however, the dowel holder of the dowel transfer station is shown in a horizontal sectional view.
Figure 3:
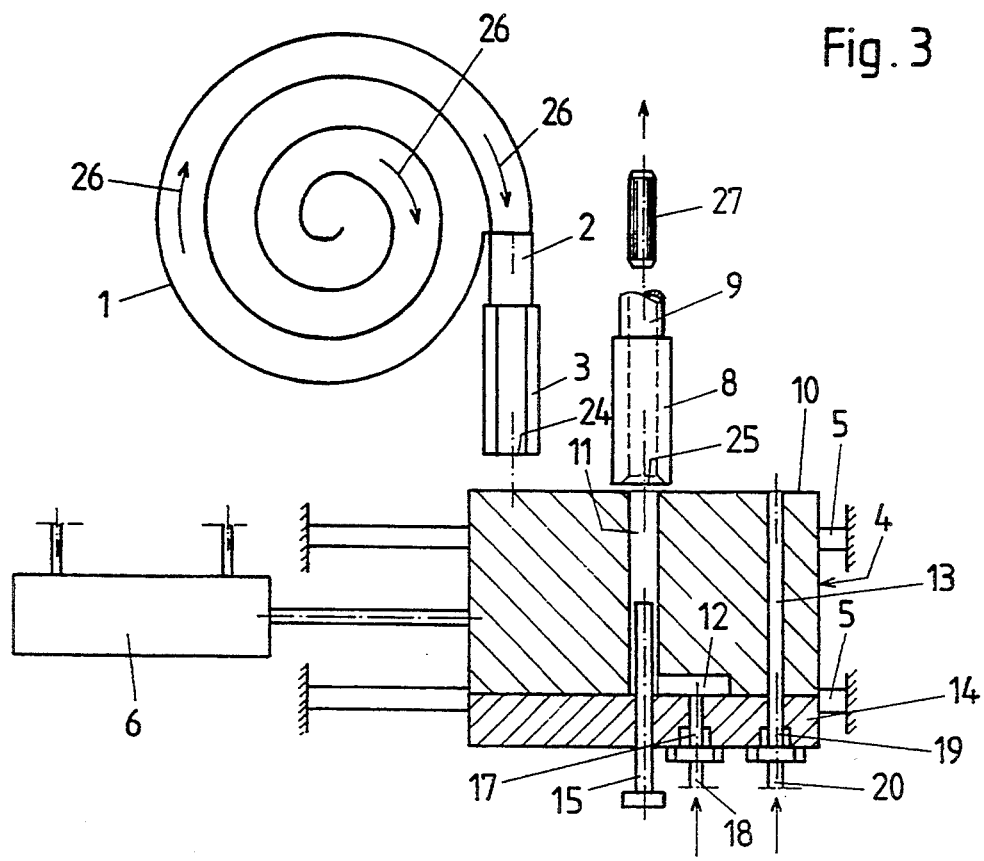
FIG. 3 is the same view as FIG. 2, however, the dowel holder is shown in a different position of operation.

The specific configuration of the dowel holder 4 is apparent from the sectional views of FIGS. 2 and 3. The dowel holder 4 has a bore 11 whose outer opening is located in an end face 10 of the dowel holder 4 which extends parallel to the direction of displacement thereof. An inner end of the bore 11 has a laterally extending recess 12. Another bore 13 is provided in the dowel holder 4. These two bores 11 and 13 extend parallel to each other and entirely through the carriage forming the dowel holder 4. The bores are closed by means of a beam-like connecting piece 14 mounted on the side of the dowel holder 4 facing away from the groove 3 and the retainer 8. The connecting piece 14 has a bore which is in alignment with the axis of the bore 11. This bore receives a shaft 15 which is mounted so as to be axially displaceable in this bore and so that it can be secured in its position, for example, by means of a clamping screw 16 which is indicated in FIG. 1. Instead of providing such a clamping screw 16, the bore could also be constructed as a threaded bore and the shaft 15 could be a threaded shaft. The purpose of the shaft 15 is to adjust the depth T which corresponds to the length of the dowel to be transferred. The connecting piece 14 has another bore 17 which opens into the recess 12 of the bore 11. A compressed air hose 18 is connected to the bore 17. An additional bore 19 provided in the beam-like connecting piece 14 is arranged coaxially with the bore 13. A compressed air hose 20 is connected to the bore 19. Electrically controllable valves 22 and 23 are provided in the compressed air hoses 18 and 20 connected to the line 21. The distance between the bores 11 and 13 corresponds to the distance between the groove 3 and the retainer 8 or hose 9.

As is further apparent from the figures of the drawing, the plane E1 of the outer opening of the bore 11 which coincides with the end face 10 of the dowel holder 4 is spaced apart by only a very slight distance from the plane E2 of the opening 25 of the hose 9 and the retainer 8. This distance is selected in such a way that, during operation of the dowel transfer station, the dowel holder 4 can just be displaced without impairment. The distance between the plane E1 of the outer opening of the bore 11 from the plane E3 of the dowel outlet opening 24 of the groove 3 is substantially greater, i.e., approximately 5 to 10 mm.

The displacement path of the dowel holder 4 in the direction of arrow 7 is limited by stops, not shown, and is dimensioned in such a way that, in one end position shown in FIGS. 1 and 2, the bore 11 is in alignment with the groove 3 and the bore 13 is in alignment with the opening 25 of the hose 9 and, in the other end position shown in FIG. 3, the bore 11 is in alignment with the opening 25 of the hose 9. The valves 22 and 23 provided in the compressed air line are included in the control circuit of the dowel driving device. The length of the dowel holder 4 is dimensioned such that its end face 10 is located in front of the dowel outlet opening 24 of the groove 3 in both end positions shown in FIGS. 1 and 3.

The dowel transfer station according to the present invention operates as follows:

The oscillating conveyor 1 contains a quantity of dowels which include dowels having the length T and other individual dowels which have a length which deviates from the length T, i.e., a length which is greater or smaller than the length T. Initially, the dowel holder 4 is in the position shown in FIGS. 1 and 2. The valves 22 and 23 are closed. When the oscillating conveyor 1 is switched on, the dowels in the oscillating conveyor 1 are moved on the inner, open grooves of the oscillating conveyor 1 in a row in the direction of arrows 26 and then reach the pipe piece 2 and the open groove 3 and the bore 11 which receives a dowel having the length T. Now the piston-cylinder unit 6 is actuated and the unit 6 moves the dowel holder 4 into the position shown in FIG. 3 and, after a brief opening of the valve 22, the dowel in the bore 11 is blown by compressed air into the hose 9. At this time, the end face 10 of the dowel holder 4 located in front of the dowel outlet opening 24 of the groove 3 prevents additional dowels from being transported out of the oscillating conveyor 1. Subsequently, the piston-cylinder unit 6 returns the dowel holder 4 into its initial position shown in FIGS. 1 and 2 and, by opening the valve 23, it is ensured that an additional strong flow of compressed air through the bore 13 reliably conveys the dowel which has already entered the hose 9 to the driving gun which is not shown in the drawing. In the meantime, another dowel has been conveyed through the groove 3 into the bore 11 and the operation described above is repeated.

Figure 4:
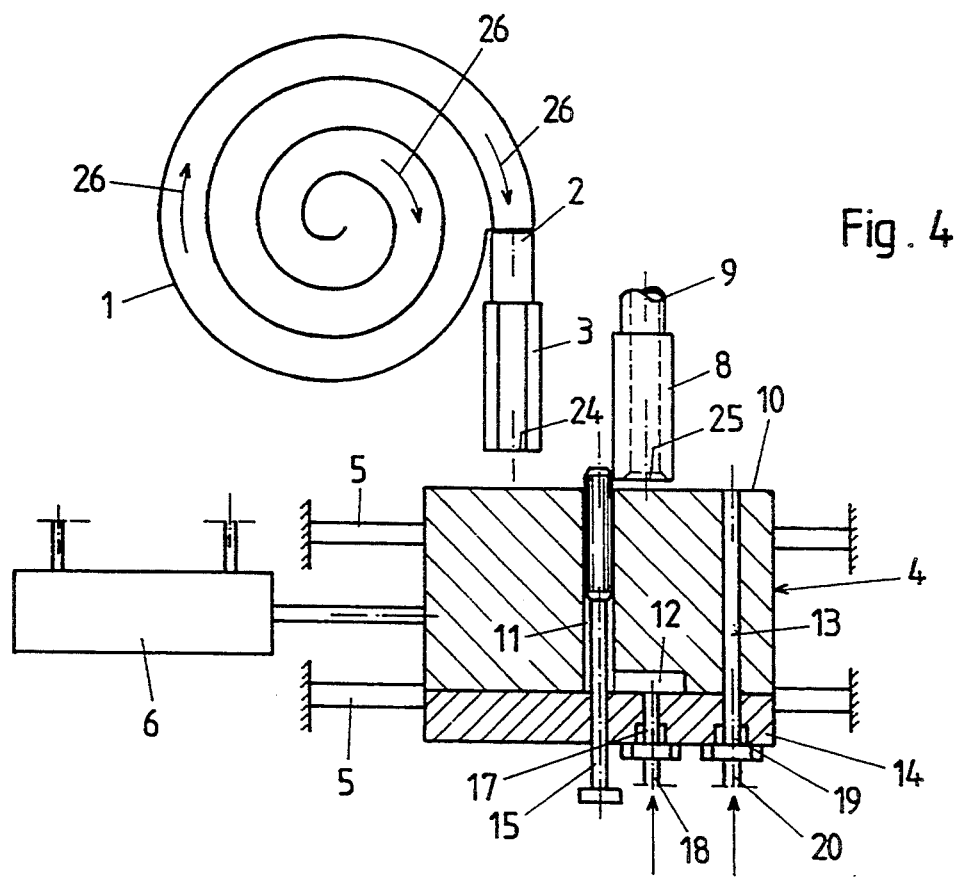
FIG. 4 is a view similar to FIG. 3, shown with the dowel holder in a position in which a dowel which is too long causes a problem.

When a dowel which has a greater length than the adjusted dimension T enters the bore 11, the end of this dowel projects to some extent beyond the end face 10 of the dowel holder 4 and, when the dowel holder 4 is subsequently displaced, the projecting end of the dowel contacts the side of the retainer 8 as shown in FIG. 4 and, consequently, blocks a further displacement of the dowel holder 4 into its intended end position. This problem is now indicated by an acoustic and/or optical signal and, after the dowel having too great a length is removed manually from the dowel holder 4 or is blown out, the above-described operation can begin again.

If a dowel which is too short is received by the bore 11, the next following dowel in the row of dowels also extends into the bore 11, but the remaining length of the dowel is still in the groove 3 and, as a result, forms a lock which blocks displacement of the dowel holder 4 from the position shown in FIGS. 1 and 2. This problem is again indicated by an acoustic and/or optical signal. Also in this case, the dowel which is too short is blown out of the bore 11 by a manual operation.

Accordingly, a signal indicating a problem is produced either when the dowel holder cannot be displaced or when the dowel holder cannot be moved over the entire distance between the end positions thereof.

It is also basically possible and within the scope of the present invention to arrange the dowel outlet opening 24 of the groove 3 immediately adjacent of the end face 10 of the dowel holder 4, so that the distance between the two components corresponds to the distance between the planes E1 and E2. In this case, when a dowel having a length which deviates from length T enters the bore 11, the displacement of the dowel holder 4 is blocked, independently of whether the dowel is too long or too short. However, it must be observed in this case that the diameter of the bore 11 is usually greater than the diameter of the various dowels being processed. Thus, if in this case the groove 3 is to have the purpose of blocking the displacement of the dowel holder 4 when the dowel in the bore 11 has the inappropriate length, it cannot be excluded that, because of the diameter differences mentioned above, the dowel projecting from the end face 10 of the dowel holder 4 can be forced over the rim of the groove 3 when the piston-cylinder unit 6 is actuated. In order to prevent this possibility, the groove 3 could be replaced by a circumferentially closed pipe, so that the end of this pipe extends immediately to the end face 10 of the dowel holder 4. However, this impairs the accessibility of the dowel transfer station. Another possibility would be to have the end of the groove 3 extend immediately to the end face 10 of the dowel holder 4 and to slightly shorten the right edge of the groove 3 as seen in the drawing, so that a dowel which has been received by the bore 11 but projects out of the bore 11 because of its length can be moved without impairment out of the groove when the piston-cylinder unit 6 is actuated.

The dowel holder 4 has such a length that its end face 10 is located in front of the dowel outlet opening 24 of the groove 3 in all possible positions of operation, so that no additional dowels can be conveyed out of the oscillating conveyer 1.

In order to avoid producing the recess 12 when the dowel transfer station is manufactured, the shaft 15 could be provided with a longitudinal bore and the compressed air hose 18 could be connected to the outer end of the shaft 15. The compressed air would then be blown through the shaft 15 and would directly act on the inner end face of the dowel which is in the bore 11.

FIGS. 1-4 of the drawing all show one possible type of dowel 27. The oscillating conveyor 1 is illustrated only symbolically and its scale is in no relation to the illustrated dowel. The helically extending line shown in the drawing merely indicates an oscillating conveyor 1 which leads to the pipe piece 2 and the groove 3, wherein this line is shown without the actual scale relative to the illustrated dowel.

The invention is not limited by the embodiments described above which are presented as examples only but can be modified in various ways within the scope of protection defined by the appended patent claims.

I claim:

1. A dowel transfer station in a dowel driving device for transferring dowels having a predetermined length from an outlet opening of a dowel separating and conveying unit to an opening of a hose line for supplying the dowels to a manually operated dowel driving gun, the dowel transfer station comprising a reciprocating dowel holder, the dowel holder having a first bore, the first bore having an adjustable depth, a first end of the bore defining an opening and a compressed air line being connected to a second end of the bore, the compressed air line comprising a valve for controlling supply of compressed air to the bore, the dowel holder being movable between a first end position in which the first bore is in alignment with the outlet opening of the dowel separating and conveying unit and a second end position in which the first bore is in alignment with the opening of the hose line, the outlet opening of the dowel separating and conveying unit being located in a first plane, the opening of the hose line being located in a second plane, and the opening of the first bore being located in a third plane, the planes extending parallel to each other and being arranged at distances from each other, wherein at least one of the distances between the third plane and the first plane and between the third plane and the second plane is small, such that the movement of the dowel holder between the first end position and the second end position is blocked when a dowel is introduced into the first bore which has a length which does not correspond to an adjusted depth of the first bore.

2. The dowel transfer station according to claim 1, wherein the dowel separating and conveying unit is an oscillating conveyor.

3. The dowel transfer station according to claim 1, wherein at least one of the distances between the third plane and the second plane and between the third plane and the first plane is equal to or less than 1 mm.

4. The dowel transfer station according to claim 1, wherein the distance between the first plane and the third plane is greater than the distance between the second plane and third plane.

5. The dowel transfer station according to claim 4, wherein the distance between the first plane and third plane is between approximately 5 mm and 10 mm.

6. The dowel transfer station according to claim 1, wherein the dowel holder has a second bore extending parallel to the first bore, the second compressed air line comprising another valve for controlling the supply of compressed air to the second bore, wherein a distance between the two parallel bores corresponds to a distance between the first end position and the second end position of the dowel holder.

7. The dowel transfer station according to claim 6, wherein the first and second bores have diameters, and wherein the diameter of the second bore is smaller than the diameter of the first bore.

8. The dowel transfer station according to claim 1, further comprising a shaft extending through the second end of the first bore into the first bore, the shaft extending coaxially with the first bore, the shaft being axially adjustable for adjusting the depth of the first bore, and means for securing the shaft in an adjusted position.

9. The dowel transfer station according to claim 1, wherein the dowel holder defines a recess at the second end of the first bore, the recess being in communication with the compressed air line and the first bore.

10. The dowel transfer station according to claim 1, wherein the dowel holder comprises a carriage, the carriage having a width, the two bores extending over the width of the bore, further comprising a piston-cylinder unit for moving the carriage, and a connecting piece connected to the carriage, the connecting piece having a first bore for receiving the shaft, a second bore in communication with the first bore of the carriage and a third bore in communication with the second bore of the carriage.

11. The dowel transfer station according to claim 1, wherein at least a portion of the dowel separating and conveying unit adjacent the dowel holder is an open groove.

12. The dowel transfer station according to claim 1, wherein the dowel holder includes an end face, the first end of the first bore opening at the end face, wherein the dowel holder is arranged such that the end face is located in front of the outlet opening of the dowel separating and conveying unit over the entire travel distance between the first and second end positions thereof.

* * * * *